June 11, 1957   D. R. WILLIAMS ET AL   2,795,250
WORKTABLE INSERT
Filed Nov. 18, 1954

INVENTOR.
DONALD R. WILLIAMS
BY SAMPSON G. JAMES

*Thos S Donnelly*
ATTORNEY

United States Patent Office 2,795,250
Patented June 11, 1957

2,795,250

WORKTABLE INSERT

Donald R. Williams, Dearborn, and Sampson G. James, Belleville, Mich.,

Application November 18, 1954, Serial No. 469,745

2 Claims. (Cl. 144—134)

Our invention relates to a new and useful improvement in a worktable insert adapted for use on worktables with which power operated working tools are used.

In the use of such worktables, it is frequently necessary to change the type of tool which is being used to another type of tool depending upon the work to be done. This requires considerable alteration of the working mechanisms and involves a considerable delay.

In the present invention, we provide an insert which may be readily and quickly inserted in an opening formed in a worktable and which carries the necessary parts for connecting to a drive engine and for connecting the various types of working tools so that a change from one tool to another may be easily and quickly effected.

Another object of the invention is the provision of a worktable insert on which is permanently mounted a rotatable shaft which is designed to be power driven and on which various types of working tools may be easily and quickly mounted.

Other objects will appear hereinafter.

It is recognized that various modifications and changes may be made in the details of the structure illustrated without departing from the invention, and it is intended that the present disclosure shall be considered to be but the preferred embodiment.

Forming a part of this application are drawings in which.

Figure 1:
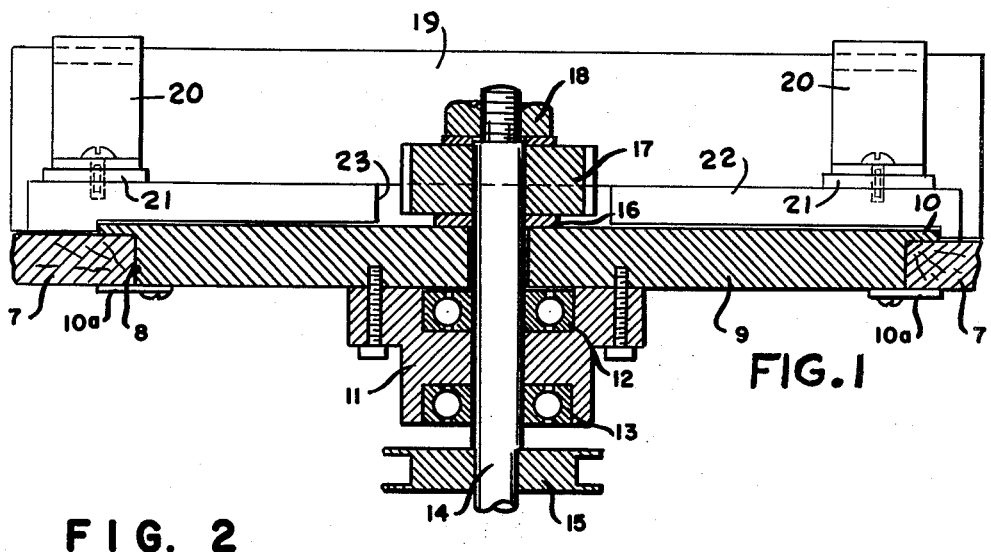
Fig. 1 is a central vertical sectional view of the invention illustrated in Fig. 2, taken along the line 1—1 thereof.

As shown in the drawings, the worktable 7 is provided with a cut-out portion 8 in which is adapted to be inserted the insert 9 having the peripheral flange 10 which overlies the upper surface of the table 7 and which is secured in position by the keepers 10a as they engage the lower surface of the worktable 7. Fixedly mounted on the lower face of the insert 9 and depending therefrom is a head 11 in which are permanently mounted the bearings 12 and 13 in which the shaft 14 rotates. Fixedly mounted on this shaft is a pulley 15 adapted to be attached to a suitable source of power so that the shaft may be rotated. Mounted on the upper end of the shaft 14 is a working tool 17 spaced from the insert 9 by means of the spacer 16 and held in position by the nut 18 which is threaded on the shaft 14.

Projecting upwardly from the table 7 is a rail 19 over which engages a Z-shaped hook 20 which is secured to a guide plate 22 and spaced therefrom by the plate 21. This guide plate is provided adjacent the working tool 17 with a cut-out recess 23 so as to serve for a guide in guiding the workpiece when being operated upon by the working tool 17.

Figure 2:
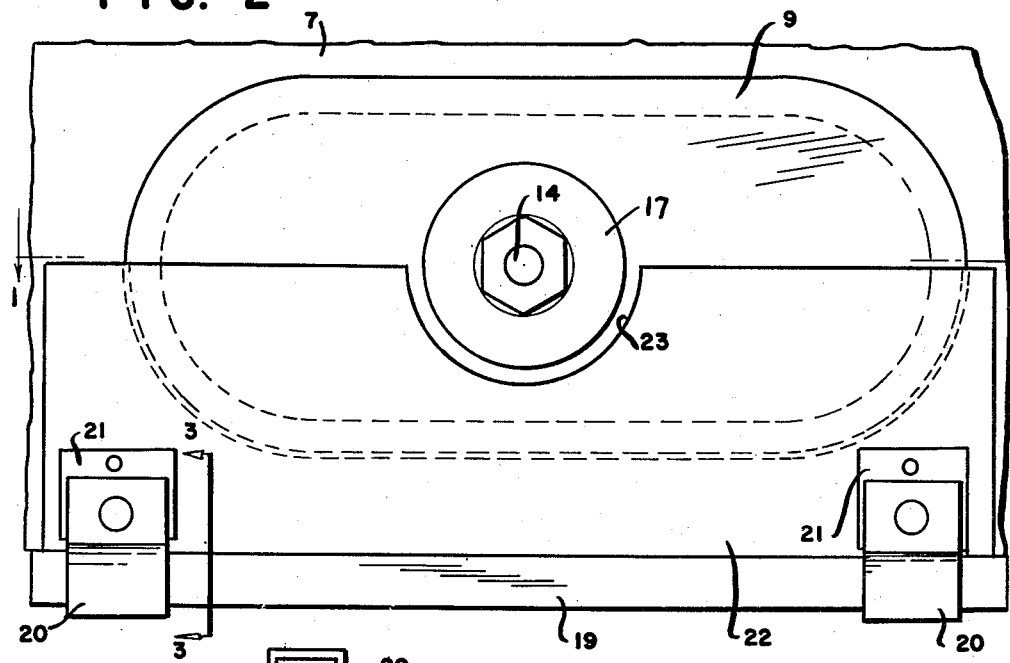
Fig. 2 is a top plan view of the invention showing it installed.
Figure 3:
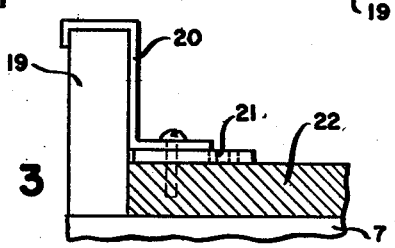
Fig. 3 is a fragmentary sectional view taken on the line 3—3 of Fig. 2.

When it is desired to use the working tool as a tool operating in a horizontal plane, or in a plane parallel to the worktable 7 as distinguished from a working tool, such as a saw working in a plane vertical to the plane of the worktable 7, it is but necessary to insert the insert 9 in the cut-out portion 8 of the worktable 7, as shown in Fig. 1 and Fig. 2. This is easily and quickly accomplished. It is to be noted that this insert permanently carries mounted thereon a rotatable shaft in bearings and is provided with a driving pulley 15 while the shaft itself projects above the insert 9 sufficiently for extension of a suitable working tool 17.

Experience has shown that with a worktable insert of this class the change over from one type of operation to another may be easily and quickly effected. It will be understood, however, that the guide plate 22 must first be removed before the insert 9 may be removed. Of course, the working tool 17 may be removed and replaced with other types of working tools.

The invention lends itself particularly for easily and quickly changing to an operation in which it is desired to use different tools, such as a shaper, a planer, or a router.

What we claim is:

1. In a woodworking machine, the combination of a worktable having a cut-out portion formed therein; a planar insert for insertion into said cut-out portion of said table; a peripheral flange on said planar insert extending outwardly therefrom and overlying and engaging the upper face of said worktable; keepers mounted on the lower face of said insert and engaging the lower face of said worktable for retaining said insert in fixed relation thereto; a shaft rotatably carried by said insert and projecting upwardly beyond the upper face thereof; a pulley fixedly mounted on the lower end of said shaft and adapted for attachment to a source of power for rotating said shaft; means for securing a working tool on said shaft above said upper face of said insert; a head mounted on and depending from the lower face of said insert; and bearings carried by said head, said shaft being journalled in said bearings; an upwardly projecting rail on said worktable; a guide plate removably mounted on said worktable adjacent said shaft and provided with a cut-out recess for the reception of a working tool mounted on the shaft; and means for detachably fastening said guide plate to said rail for retaining the guide plate in position on the worktable.

2. The invention as set forth in claim 1, wherein: said means for detachably fastening said guide plate to said rail comprises a pair of retainer members, each of which includes a U-shaped portion adapted to be slidably engaged on the top of the rail, and an L-shaped portion attached to said U-shaped portion; and means for fixedly mounting one leg of said L-shaped portion to the top side of the guide plate.

References Cited in the file of this patent

UNITED STATES PATENTS

| 679,078 | Kimball | July 23, 1901 |
| 1,016,253 | Denegar | Feb. 6, 1912 |
| 1,542,991 | Dornbush | June 23, 1925 |
| 1,576,249 | Sherman | Mar. 9, 1926 |
| 2,067,652 | Tautz | Jan. 12, 1937 |
| 2,193,359 | Haas | Mar. 12, 1940 |
| 2,615,479 | Bearup | Oct. 28, 1952 |

FOREIGN PATENTS

| 568,598 | France | Dec. 24, 1926 |